Patented May 2, 1933

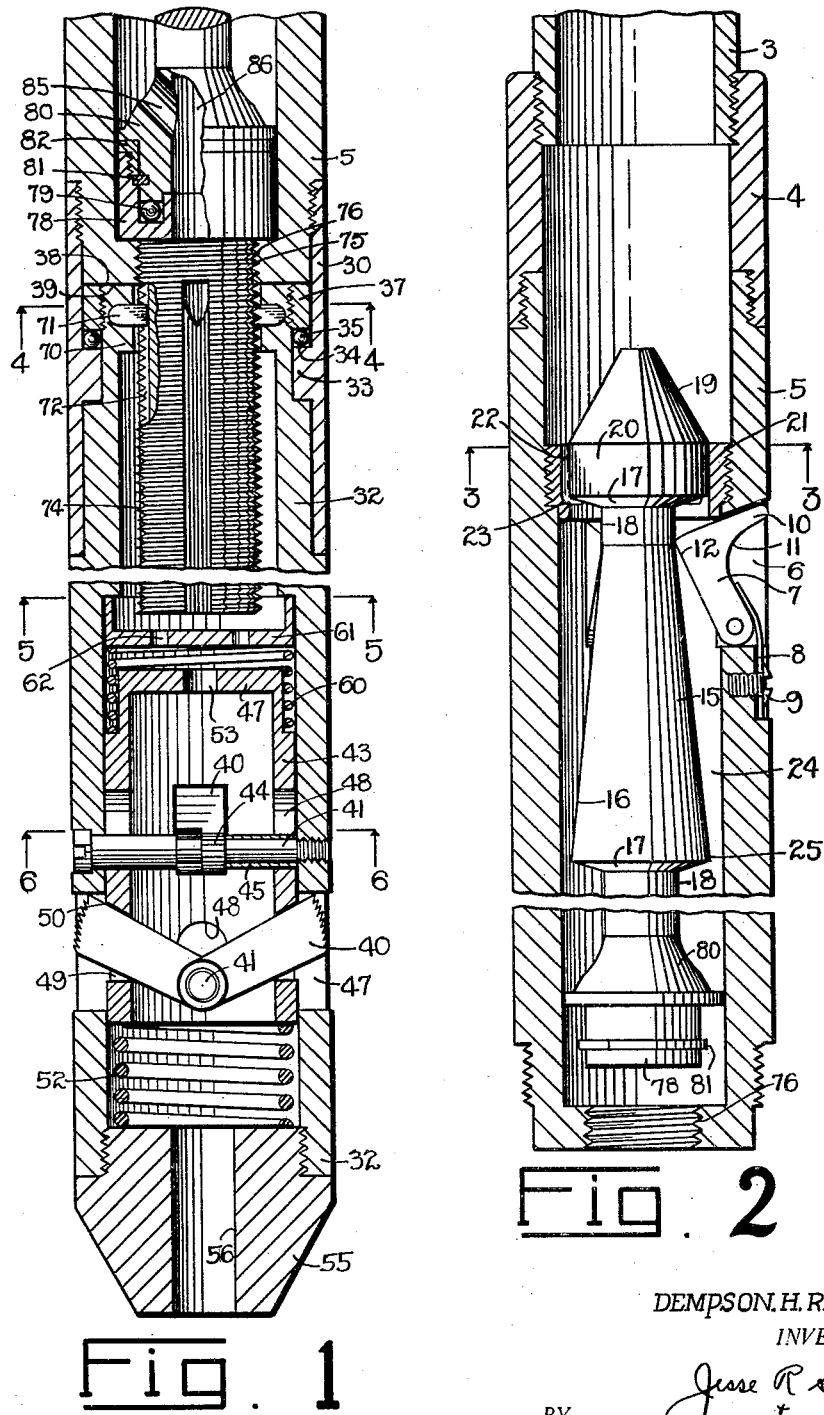

1,906,416

UNITED STATES PATENT OFFICE

DEMPSON H. REED, OF HOUSTON, TEXAS

INSIDE CUTTING TOOL

Application filed March 11, 1930. Serial No. 434,881.

The invention relates to a tool to be used in the severing strings of pipe or casing which are located in inaccessible positions, such as a bore of a well.

It is one of the objects of the invention to devise a tool which is simple and economical in its construction and operation, and which will act positively to sever the pipe.

Another object of the invention is to devise a tool for cutting pipe in combination with a latching spear.

Another object of the invention is to provide a spear operated by a fluid pressure which will serve as an anchor for the cutting tool during the cutting operation, and at the same time serve as a mechanism to remove the severed pipe.

A still further object of the invention is to provide a mandrel for expanding the cutters which is driven by a thread connection.

Another object is to provide a cutting tool having a plurality of mandrels so that successive cuts may be made without removing or resetting the tool.

It is also an object of the invention to provide a tool through which circulation of flushing fluid may be maintained during the entire period that it is lowered in the well.

Other and further objects of the invention will be readily apparent to those skilled in the art when it is considered in connection with the following description wherein:

Fig. 1 is a central vertical section of the lower portion of the tool disclosing the latching spear and the driving mechanism for the mandrel.

Fig. 2 is a vertical sectional view of the upper section of the tool showing the mandrel and the cutters.

Figure 3:
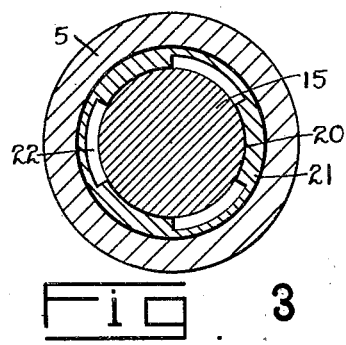
Figure 5:
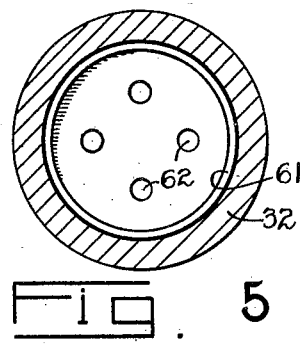
Figure 4:
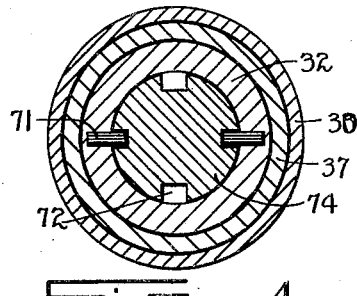
Figure 6:
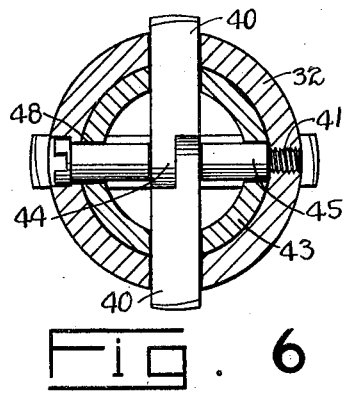

Figs. 3 to 6 inclusive are sectional views taken on corresponding sectional lines shown in Figs. 1 and 2.

The tool embodied in my invention consists of a latching spear of the type which is operated by fluid pressure. In other words, the dogs are moved to extended position by a pressure of fluid exerted through the drill stem or the string of pipe which is supporting the tool. This structure is seen in Fig. 1 where a piston is moved downwardly against a spring resistance to extend the latching dogs. Above this piston is a mandrel which carries a threaded stem. This stem is keyed to the housing which holds the latching spear and is prevented from rotation. The string of pipe, however, which supports the apparatus is connected to the spear head with a swivel connection. As the dogs engage the pipe to be cut, rotation of the supporting string of pipe causes the threaded stem to advance upwardly. This upward movement of the stem causes an upward movement of the mandrel which in turn extends the cutters which sever the pipe. The mandrel and stem are provided with fluid passages so that circulation may be maintained at all times through the tool. The threaded connection between the rotating string of pipe and the mandrel stem permits a positive advancement of the cutters, and the operator by observing the number of rotations may readily determine the amount of extension of the cutters.

Fig. 2 discloses a pipe 3 which may be the lower section of a string of drill stem or pipe which is arranged to receive a spacer 4 and a cutter housing 5. These two members may be of any desired length. The cutter housing is provided with a plurality of openings 6 in which the cutters 7 are pivoted. The small spring 8 connected to the housing by a screw 9 is arranged to retain the edges of the cutters in a retracted position. The cutters are shown as having a cutting edge 10 and a curved lower face 11 while the rear portion thereof is formed with a heel 12.

A mandrel 15 is disposed in the housing 5 and arranged for longitudinal movement therein. This mandrel is of a special construction and comprises the tapered surface 16 which terminates in a shoulder 17 connected with the neck 18. Above the tapered surface 16 is another neck 18 similar to the one disposed below the shoulder 17. A head 19 surmounts the uppermost of the necks 18 and is separated therefrom by a shoulder 17 and a cylindrical portion 20. This head is shown as having a conical formation. A ring seat 21 is disposed in the housing 5 above the cutters 7 and may be threaded or otherwise connected with the housing. Fig. 3 is a sectional view illustrating a plurality of fluid passages 22 in the ring 21. These passages which are radially disposed with respect to the mandrel 15 are arranged so that the cylindrical portion 20 will make a snug fit with the ring 21 between the passages 22. The passages 22 as seen in Fig. 2 terminate in an inwardly curved portion 23 directly above the lower edge of the ring. In this manner when the mandrel is raised to the position shown in Fig. 2, or any position thereabove, then the passages 22 will be open into the mandrel chamber 24 below the ring 21. However, the cylindrical portion 20 is arranged to prevent the flow of fluid through the ring 21 when the cylindrical portion 20 is below the position shown in Fig. 2, or when the skirt 25 of the tapered portion 16 arrives at a position adjacent the lowermost edge of the ring 21.

The foregoing structure is used for the purpose of advising the operator that the mandrel has moved to a position where the cutters 7 have been fully extended. As the mandrel 15 moves upwardly, the tapered surface 16 rides along the heel 12 gradually forcing the cutters outwardly to engage the pipe or casing to be cut. However, when the shoulder 17 passes the heel 12 the cutters will be retracted from the cutting position, and the skirt 25 will block the flow of fluid into the passages 22. This action will slow down or stall the pumps circulating the flushing fluid, and advise the operator that the cutters have been extended to their maximum position and have dropped backwardly under the shoulder 17 so that the section of pipe which has been severed is ready for removal.

While Fig. 2 illustrates one of the mandrels 15, it is intended in the actual construction of the tool to provide a plurality of these mandrels, each separated by a neck 18 and a shoulder 17. Thus, when one cut has been completed by the skirt 25 passing the cutters, the tool may then be lowered to the next desired position, and by additional rotation the cutters may be advanced for a second, third or any desired number of cuts. It should be kept in mind that the cutters are permitted to move to retracted position each time one of the skirts 25 passes the heel 12.

Below the cutter housing 5 is a swivel coupling 30 which serves to connect the housing 5 with the spear body 32. This coupling 30 is provided with a thickened central portion 33, the upper surface 34 of which serves as a ball race for the bearings 35. The spear housing 32 is threaded on its upper end to receive a retainer ring 37 which acts as the other race for the balls 35. In this manner a swivel connection is provided between the housing 5 and the body 32. The thickened portion 33 and the retaining portion 37 prevent relative longitudinal movement of the two portions. The adjacent ends 38 of the housing and 39 of the spear body are arranged to abut against each other.

The spear body 32 is arranged to be anchored to the pipe to be cut by means of the dogs 40. These dogs are pivoted on a pin 41 which is disposed transversely of the body 32, and has its ends disposed in the body 32. I have shown two sets of these dogs arranged at right angles and displaced vertically to allow for their convenient operation. These dogs have offset spindles 44 which are arranged to interfit upon the pins 41. Spacing sleeves 45 serve to retain the dogs 40 in proper alignment with the openings 47 in the body 32. The housing 32 is enlarged adjacent the position of the dogs 40 and arranged to hold the sleeve 43 which may be free for vertical sliding movement with respect to the body. This sleeve has a head 47 and is provided with cutaway portions 48 to allow the sleeve to slide with respect to the pins 41. The dogs 40 project through the openings 49 which have an inclined face at 50. This face bears against the upper edge of the dogs 40 and causes them to pivot downwardly upon the pin 41 when the sleeve 43 moves downwardly. Downward movement of the sleeve 43 is resisted by a spring 52 which normally retains the sleeve in the position shown in Fig. 1 with the dogs 40 in retracted position.

A fluid passage 53 is provided in the head 47 so that a flow of fluid may be circulated through the tool. The lower end of the body 32 carries a plug 55 which has an opening 56 therein to direct the flushing fluid out the lower end of the spear.

The upper end of the sleeve 43 is cut away to receive a spring 60 which resiliently supports a cup valve 61. This valve is provided with a plurality of openings 62 for flushing fluid. When fluid pressure occurs upon the valve 61 a predetermined amount of fluid may pass through the opening 62 and through the opening 53 in the head of the sleeve. In this manner when the tool is being lowered into the well, or removed therefrom, a circulation of fluid may be maintained at all times. However, when the tool has been lowered to the proper position in the well casing to be severed, the pump pressure is increased so that the flow exceeds the volume which may pass through the opening 62. In this manner excess pressure is exerted upon the valve 61 so that the coil spring 60 is compressed. The valve 61 thus moving downwardly against the head 47 cuts off the flow of fluid through the openings 62. When this occurs the full pressure of the pumps and the column of fluid is exerted on the sleeve 43 moving it downwardly. The face 50 engages the upper edge of the dogs and pivots them downwardly to engage the casing which has not been illustrated. When the dogs have been extended a slight upward movement of the entire string of pipe and the tool causes the toothed edges of the dogs to engage the pipe, thus anchoring the entire apparatus. As soon as the dogs have been anchored, the pump pressure may be relieved thus allowing the cup valve 61 to move upwardly so that circulation may continue. In this manner the pipe to be severed may be washed out and its removal facilitated.

The dogs 40 retain the tool in a stationary position while the cut is being made. After the cut has been completed, if it is desired to remove the severed pipe, it is merely necessary to relieve the tension on the string of pipe and lower the same to release the dogs 40. The tool is then moved upwardly and the dogs extended by increasing the pump pressure to engage the severed piece of pipe so it may be withdrawn. When, however, it is desired to make an additional cut below the one just completed, it is only necessary to relieve the tension upon the string of pipe 3, and upon a small downward movement the dogs 40 will release their hold so that the spring 52 causes the sleeve 43 to move upwardly which completes the retracting movement of the dogs. The tool may then be moved to the position where the next cut is to be made.

The upper end of the spear body 32 is provided with an inwardly extending flange 70. This flange carries a plurality of keys 71 which are arranged to slide in slots 72 provided in the threaded stem 74. In this manner the stem 74 may move longitudinally with respect to the body 32 but is restricted from rotation with respect to such body. The lower end of the cutter housing 5 is provided with an inwardly extending flange 75 which is threaded at 76, these threads being arranged to engage the threads upon the stem 74. The stem 74 terminates in an enlarged portion 78 which carries the balls 79 so that a swivel connection may be had with the base 80 of the mandrel 15. A latching ring 81 is arranged to set in a groove in the base 80. This latching ring 81 is retained in position by the locking ring 82.

To assemble this structure, balls 79 are placed in the enlarged portion 78 of the stem. The locking ring 82 is placed on the base 80 and the latching ring 81 is placed in its groove. The base 80 is then fitted into the portion 78 and rotation causes the locking ring 82 to thread into the enlarged portion 78. The latching ring 81 then prevents the longitudinal movement of the respective parts, but will permit rotation thereof when the friction between the base 80 and the latching ring 81 is overcome. The balls 79 serve to form an anti-friction thrust member or thrust bearing between the stem 74 and the mandrel 15.

It should be kept in mind that the housing 5 is to be rotated by the string of pipe 3 whereas the body 32 is to be held stationary by the dogs 40. The stem 74 is restrained from rotation by the keys 71. Rotation of the housing 5, however, causes the threads 75 and 76 to move the stem vertically. This vertical movement is transmitted to the mandrel 15 and causes the extension of the cutters 7. It is intended that the pitch of the threads 75 and 76 may be varied to obtain any desired rate of travel of the mandrel which may be found desirable. It is also intended that the length of the stem 74 may be varied in accordance with the number of the mandrels 15 which are to be employed. The views here illustrated are broken through the neck 18 and through the stem 74 and body 32 so that but a single mandrel 15 and a small section of the stem 74 is illustrated. The invention, however, is not limited to a single mandrel as a plurality of them are to be employed. The base 80 tends to support all of the mandrels and by means of the balls 79, if the friction upon any one of the mandrels is excessive and exceeds the friction of the latching ring 81, the mandrels may remain stationary and merely move upwardly in accordance with the movement of the threads 75 and 76 as the string is rotated.

The base 80 of the mandrel is provided with openings 85 which lead to a central bore 86 which extends down through the stem 74 to discharge against the cup valve 61. Thus, regardless of the longitudinal position which the stem and the mandrels may assume, a flow of flushing fluid will pass downwardly against the cup valve 61 at all times. The only time that circulation will be discontinued is during the setting of the dogs 40. This will only occupy a period of a few moments, and after the spear has once been anchored, the pressure may be relieved so that upward movement of the valve 61 will permit continued circulation.

The cylindrical portion 20 or one of the skirts 25 will cut off the flow of fluid through the stem each time a cut is completed so that the operator will be fully advised.

Various types of cutting tools are now well-known. Of these tools, however, the majority rely upon fluid pressure or some unreliable source of power for actuation of the cutters; but with my improved tool the cutters are positively actuated, and the operator by observing the number of rotations of the string 3 will know positively the amount of the advancement of the cutters. Another feature of advantage is the fact that a plurality of pieces of the pipe may be severed and all of these pieces removed at the same time from the well bore. In many instances when a piece of pipe is severed, it is so imbedded in the earth formation that it is impossible to remove it. With my tool, after the cut has been made, if it is impossible to move the piece of pipe, a very slight lowering action on the string 3 will release the dogs 40. The tool may then be raised to a position above the cut then completed, and a second or, if necessary, a third cut may be made so that a shorter section of pipe is severed.

The dogs 40 may be extended by increasing the pump pressure, and the section which could not at first be loosened may then be broken loose due to the fact that the upper end thereof is also loose. If no difficulty is encountered in loosening the first section severed, the tool may be released and moved downwardly and any desired number of additional cuts performed, dependent only upon the number of mandrels 15 which have been employed in the particular tool being used. It seems readily apparent that with a tool of this type as many as four or five pieces of pipe may be severed and remain as rings about the string of pipe 3. When all of the mandrels 15 have been used to extend the cutters, the tool may be withdrawn from the well carrying with it the several pieces of pipe which have been severed. It should be appreciated that this is very advantageous in casing cutting operations as it eliminates the necessity of removing the entire string 3 of pipe and the tool after each piece of pipe has been cut.

While I have shown and described certain embodiments of this structure, it is to be understood that various modifications and alterations may be made therein without departing from the spirit of the invention.

What I claim as new is:

1. An inside casing cutter including a cutter body, extensible cutters carried thereby, a plurality of mandrels and stem movable in said body, means to restrain said stem from rotation, and means whereby said stem will move longitudinally upon rotation of said cutter body whereby said mandrels will repeatedly extend said cutters by extended movement in one direction.

2. A pipe tool of the class described including a set of cutters, a mandrel to extend said pipe cutters, a valve adapted to be closed by said mandrel upon extension of said cutters whereby a flow of fluid will be retarded to advise the operator that the cutters have been extended, said mandrel including a plurality of tapered surfaces whereby said cutters may be repeatedly extended by continued movement of said mandrel in one direction.

3. In combination with a pipe cutting tool, a mandrel to extend the cutter blades, said mandrel including a plurality of tapered surfaces disposed in coaxial relationship whereby the cutters may be repeatedly extended upon longitudinal movement of said mandrel in one direction with respect thereto.

4. In combination with a pipe cutting tool, a mandrel to extend the cutter blades, said mandrel including a plurality of tapered surfaces disposed in coaxial relationship whereby the cutters may be repeatedly extended upon longitudinal movement of said mandrel repeatedly in one direction with respect thereto, and means formed on said mandrel and the tool body to cause longitudinal movement of said mandrel upon rotation of said body.

5. In a casing cutter, a mandrel adapted for movement to extend the cutter blades, said mandrel including a threaded stem, a cutter engaging portion joined to said stem by a swivel connection, said portion including a plurality of alternate enlarged and reduced segments whereby the cutter will alternately be extended and allowed to retract by movement of said mandrel in one direction.

6. In a casing cutter, a mandrel adapted for movement to extend the cutter blades, said mandrel including a threaded stem, a cutter engaging portion joined to said stem by a swivel connection, said portion including an enlarged tapered skirt, and a reduced neck whereby the cutters will be extended and permitted to retract as the mandrel moves longitudinally.

7. In a casing cutter, a mandrel adapted for movement to extend the cutter blades, said mandrel including a threaded stem, a cutter engaging portion joined to said stem by a swivel connection, said portion including a plurality of alternate enlarged and reduced segments whereby the cutter will alternately be extended and allowed to retract, and a valve carried by said cutter and adapted to be alternately closed and opened upon movement of said enlarged and reduced segments therethru.

8. In a casing cutter, a mandrel adapted for movement to extend the cutter blades, said mandrel including a threaded stem, a cutter engaging portion joined to said stem by a swivel connection, said portion including a plurality of alternate enlarged and reduced segments whereby the cutter will alternately be extended and allowed to retract, and a valve carried by said cutter and adapted to be alternately closed and opened upon movement of said enlarged and reduced segments therethru, whereby the operator is advised of the movement of the cutters by the operation of the pumps causing the flow of liquid thru said valve.

In testimony whereof I hereunto affix my signature this 7th day of March, A. D. 1930.

DEMPSON H. REED.